May 31, 1960 I. HURWITZ 2,939,080

ELECTRONIC CHOPPING DEVICE

Filed March 1, 1954 2 Sheets-Sheet 1

INVENTOR.
Irving Hurwitz 2,939,080

ELECTRONIC CHOPPING DEVICE

Irving Hurwitz, 2819 Morris Ave., New York, N.Y.

Filed Mar. 1, 1954, Ser. No. 413,187
17 Claims. (Cl. 328—27)

This invention relates to direct current amplifiers, and more particularly to an electronic chopper which can be used on very low magnitude direct current, or slowly varying alternating current, signals.

The need for amplifiers which will amplify a low-level direct current, or slowly varying alternating current, signal voltage (hereinafter collectively included in the terms "substantially direct current wave," "substantially direct current signal," or "substantially direct current voltage") has increased as the electronics art has progressed. Direct current amplifiers of this type can be utilized in servomechanisms, electrocardiographs, various types of measuring instruments, and computers, to mention only a few applications. However, circuits used in the past have not been sensitive enough and have been subject to various defects, such as lack of stability. Among other difficulties heretofore encountered in the amplification of low-level voltages of the order of microvolts and millivolts has been the interfering effect of the contact potential of the amplifier tube, which results in a masking of the voltage to be amplified. This invention obviates this difficulty by actually utilizing the contact potentials of one or more unidirectional conducting devices in the attempt to avoid or minimize the effect of these potentials. The contact potentials are employed to produce a predetermined reference voltage, zero volts with respect to ground being the most desirable to use in most applications.

Mechanical choppers have also been employed, but are subject to mechanical wear-and-tear and are limited as to chopping frequency. In general, circuits which have been devised to attain sensitivity and to minimize other defects have been costly or complicated, or both.

It is therefore a primary object of this invention to provide an improved method and means for converting substantially direct current voltages of very small magnitudes into cyclically varying voltages capable of being amplified by ordinary alternating current amplifiers.

It is another object of this invention to overcome the masking effect of the contact potential of an amplifying device on low-level input signals.

It is yet another object of this invention to provide a direct current amplifier which is relatively simple and economical to manufacture.

Further objects of this invention and its novel features will become apparent by referring to the following description and claims in conjunction with the accompanying drawings, in which:

Figure 1:
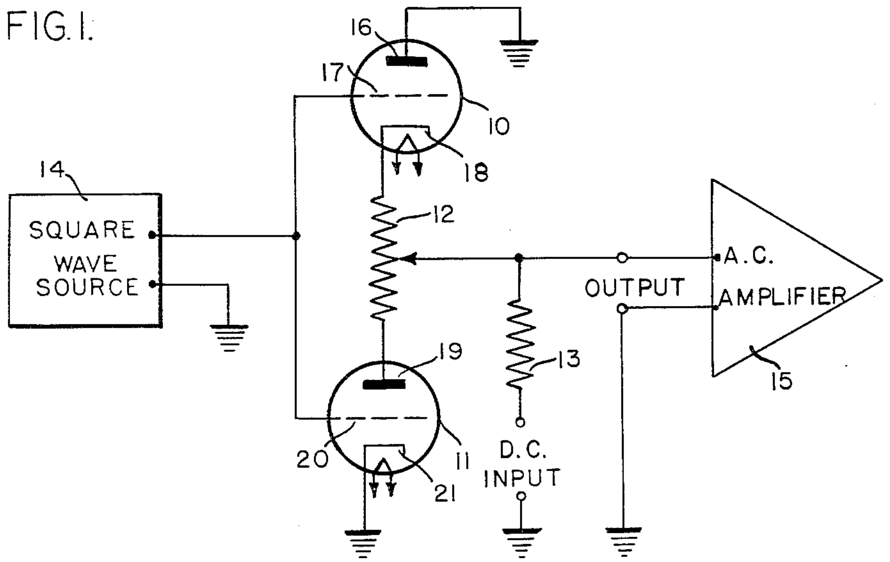
Figure 1 is a circuit diagram of a first embodiment of a direct current amplifier in accordance with this invention.

The first embodiment of this invention shown in Figure 1 comprises a pair of electron tubes 10 and 11 arranged in series connection. The collecting element, or anode 16, of tube 10 and the emitting element, or cathode 21, of tube 11 are grounded. The control element, or grid 17, of tube 10 is directly connected to the control element, or grid 20, of tube 11.

To explain the operation of the circuit, assume that all elements to the right of the movable contact of potential-dividing impedance 12 (preferably a potentiometer) have been temporarily removed from the circuit and that potentiometer 12 has been replaced by a direct connection between the emitting element, or cathode 18, of tube 10 and the collecting element, or anode 19, of tube 11. Assume further that the grids 17 and 20 of the tubes 10 and 11 are at a potential of zero volts. Under these conditions, a small current flows through the series circuit formed by the tubes 10 and 11. This small current is thought to be primarily the result of the contact potential that exists within each tube.

If each tube has identical characteristics, no measurable voltage exists across either, because the voltage drop across the internal resistance of each tube is equal to the contact potential causing the drop. Thus, the potential at the cathode 18 and at the anode 19 (which, according to assumption, are directly connected) is ground potential.

However, since the characteristics of any two tubes are not usually identical, the potential at the connection between the cathode 18 of tube 10 and the anode 19 of tube 11 will not be ground potential in practice. To remedy this, a potentiometer 12 is inserted between the cathode 18 and the anode 19. At some point along the potentiometer 12, ground potential will now exist, and it is at this point of zero voltage with respect to ground (which may be called the null, or reference, point) that the movable contact of potentiometer 12 is set. The zero voltage at the null point may be termed the null voltage, or the reference voltage.

The movable contact of the potentiometer 12 is connected to one terminal of an output impedance 13, which preferably is a resistor. The other terminal of the impedance 13 is connected to one side of the direct current input, the other side of the direct current input being grounded. (The direct current input referred to here is not a source of direct current supply voltage. It is the low-level direct current input signal which is to be chopped into an alternating current signal.) The insertion of the direct current input and the output impedance 13 between ground and the movable contact of the potentiometer 12 has no electrical effect on the circuit since both ends of this series composite element are affixed to points which are at ground potential. Thus any direct current input signal potential applied at the direct current input terminals is completely absorbed as a voltage drop across the output impedance 13 and the potential at the upper end of the output impedance 13 (or the moving arm of the reference potentiometer 12) remains ground potential.

The assumption previously made of ground potential on the grids 17 and 20 of tubes 10 and 11 can now be discarded. What is actually applied to the grids 17 and 20 is a square wave which varies in amplitude between zero volts and some negative value more than sufficient to drive the tubes 10 and 11 beyond cut-off. When the grids 17 and 20 are at zero volts, the tubes 10 and 11 conduct and the movable contact of the potentiometer 12 is at ground potential, as explained above. Since the output voltage is taken from the movable contact of the potentiometer 12 to ground, the output voltage is zero volts at this time. When the square wave drives the tubes 10 and 11 beyond cut-off, no current flows through the potentiometer 12. The potentiometer 12 is now electrically disconnected at both ends or "floating." The movable contact of the potentiometer 12 is also floating, hence the potential at the movable contact of the potentiometer 12, and at the output terminal, is solely the substantially direct current input potential. Thus, we have an intermittent, or cyclically varying, output wave which has the form of a square wave, and which varies in amplitude between the reference voltage of zero volts and the amplitude of the substantially direct current input signal. It is immaterial whether the polarity of the substantially direct current input signal is positive or negative.

Figure 2:
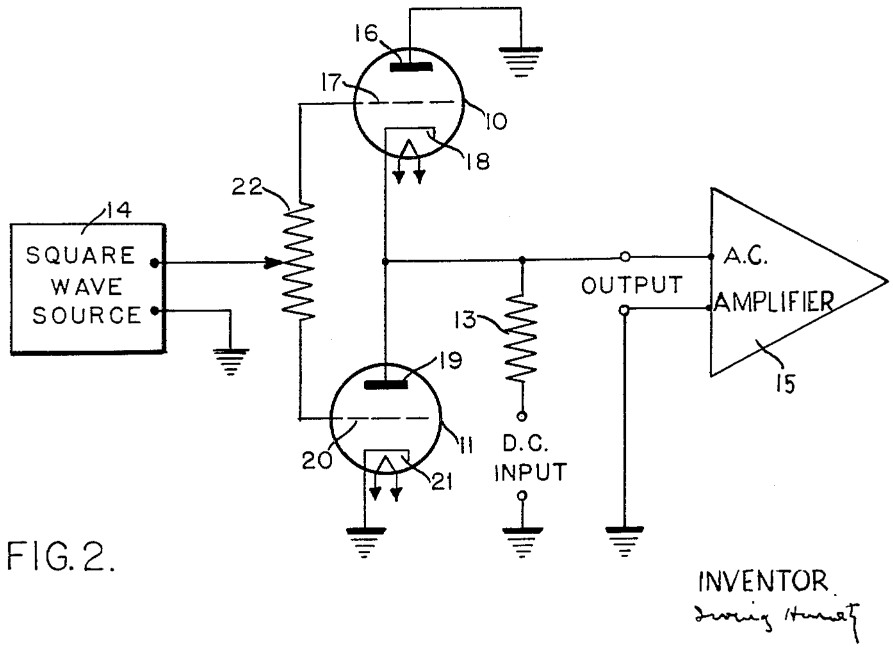
Figure 2 is a circuit diagram of a second embodiment of this invention.

Figure 2 illustrates another embodiment of the invention. The potentiometer 12, shown in Figure 1, is replaced by a direct connection between the cathode 18 of the tube 10 and the anode 19 of the tube 11. Instead of a direct connection between the grid 17 and the grid 20 of tubes 10 and 11, grid 17 is connected to one terminal of a potentiometer 22, and grid 20 is connected to the other terminal of potentiometer 22. The movable contact of the potentiometer 22 is connected to the square wave source 14. Aside from the above changes, the embodiment shown in Figure 2 is identical with the embodiment shown in Figure 1. Here again, a point of zero potential with respect to ground is made to appear at the direct connection between cathode 18 and anode 19. This is accomplished by varying the setting of the movable contact of the potentiometer 22, which, is turn, increases the voltage applied to one grid while decreasing the voltage applied to the other. Increasing the voltage applied to a grid decreases the internal resistance of the tube, whereas decreasing the voltage increases the internal resistance. In effect, the tubes constitute variable resistors in a voltage divider in which the voltage is supplied by the contact potentials of the tubes, and the center of which can be set at ground potential by changing the values of the variable resistors.

As has been explained, the output voltage is a cyclically varying wave. This wave is then applied to the input of a conventional alternating current amplifier 15. Since the frequency of the square wave input applied to grids 17 and 20 may, if desired, be low (e.g., 60 cycles per second), the alternating current amplifier 15 need not be a wide-band amplifier; high gain per stage may therefore be achieved easily. This leads to greater economy in manufacturing direct current amplifiers of this type, an advantage which also applies to the design of the square wave oscillator 14.

Figure 3:
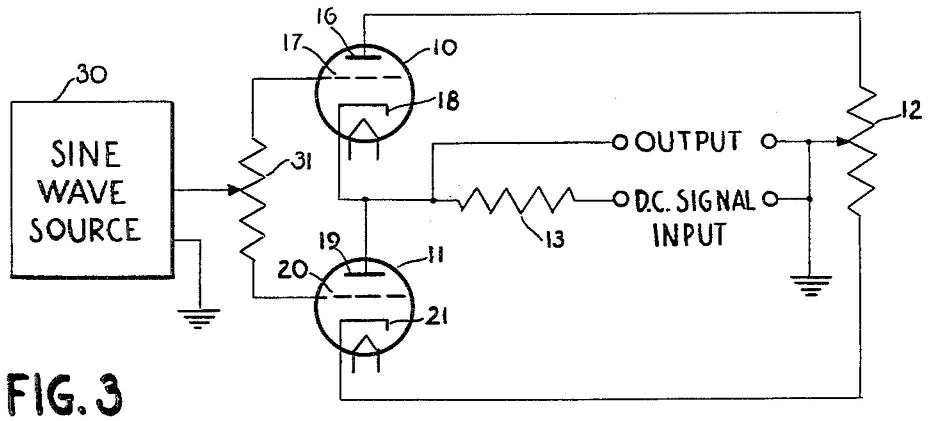
Figure 3 is a circuit diagram of a third embodiment of this invention.

A further modification of the invention shown in Figure 1 has a direct connection between cathode 18 and anode 19 in place of potentiometer 12 (see Fig. 3). The terminals of potentiometer 12 are connected to anode 16 and cathode 21, and the movable arm of potentiometer 12 is connected to ground. One terminal of impedance 13 is connected to cathode 18 from which the output is taken.

In this modification, the movable contact of the potentiometer 12 is set at the point at which the potential on the potentiometer 12 equals the potential at the connection between the cathode 18 of tube 10 and the anode 19 of the tube 11 (when the tubes 10 and 11 are in their conducting conditions of course). This potential is zero volts with respect to ground only because the movable contact of the potentiometer 12 is grounded.

It is, of course, obvious that the pair of triodes shown in the drawings may be replaced by a dual triode, or by other unidirectional conducting devices, such as diodes, multigrid tubes, or transistors. Small changes in circuitry may be necessary to adapt the invention to a particular unidirectional conducting device, but the essential nature of the invention remains unchanged. The use of any of these other unidirectional conducting devices merely creates other embodiments of this invention.

Figure 4:
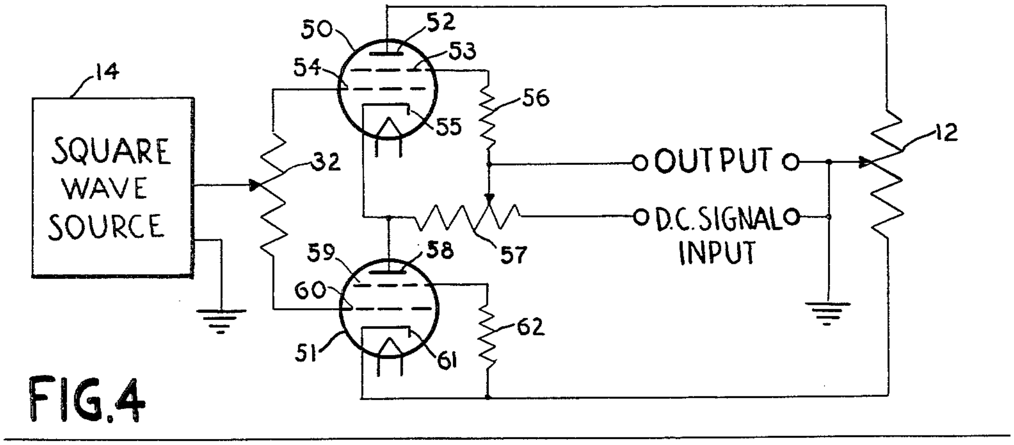
Figure 4 is a circuit diagram of a fourth embodiment of this invention employing tetrodes.

Thus, for example, the embodiment illustrated in the circuit diagram of Figure 4 shows how a pair of tetrodes may be employed in this invention.

The embodiment illustrated in Fig. 4 is very similar to that of Fig. 3 except for the employment of tetrodes 50 and 51 in place of triodes 10 and 11. Without any D.C. input signal applied to the circuit and while the tubes are in a conducting condition, the movable arm of output potentiometer 57 is set at its extreme left position, so that no part of the resistance of the potentiometer is in the screen grid circuit. The movable arm of the potentiometer 12 is then set at the point at which its potential is equal to the potential at the direct connection between the cathode 55 of the tube 50 and the anode 58 of the tube 51. This potential is then fixed at ground potential by grounding the movable arm of the potentiometer 12.

The screen grid 59 of the lower tetrode 51 is connected to its cathode 61 thru a resistor 62.

The screen grid 53 of the upper tetrode 50 is coupled to the movable arm of the output potentiometer 57 thru a resistor 56. Better balance control and stability is provided by setting the movable arm of the potentiometer 57 so that some part fo the potentiometer resistance is in the screen grid circuit, altho resistor 56 could be connected directly between the screen grid 53 and the cathode 55, as is done in the lower tube 51. Since there is a flow of current thru the screen grid circuit of the upper tube 50, when the movable arm of the potentiometer 57 is moved over to the right to include some of the potentiometer resistance in the screen grid circuit, a voltage drop occurs across this included resistance and the internal impedance of the tube 51. This upsets the previous potential established at the cathode 55 and establishes a new potential at the movable arm of potentiometer 57. The movable arm of potentiometer 12 is then simply reset at a point on the potentiometer where the potential equals the new potential at the movable arm of the potentiometer 57. Thus, the condition of balance is reestablished, but this time, the equal potential points are the movable arms of potentiometers 57 and 12.

The operation of the circuit after setting up the equal potential points is identical to that of Fig. 3.

Figure 5:
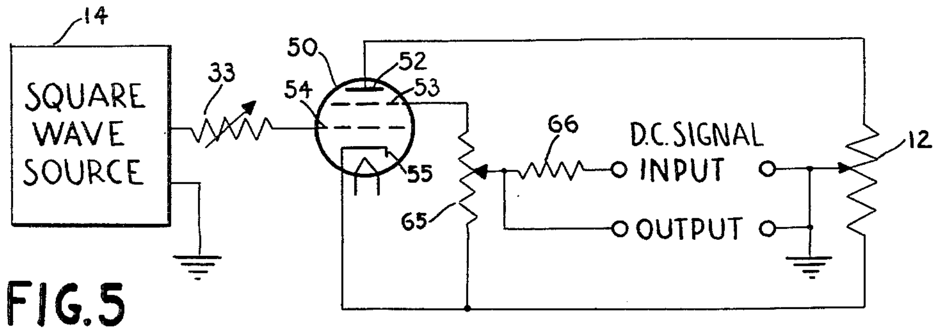
Figure 5 is a circuit diagram of a fifth embodiment of this invention in which the two sources of contact potential are obtained from a single unidirectional conducting device.

Fig. 5 shows a further modification of the embodiment illustrated in Fig. 4. In effect, it is simply Fig. 4 redrawn but with tube 51 shorted out. Resistor 33 of Fig. 5 is functionally equivalent to the section of resistor 32 (Fig. 4) included between the movable tap and grid 54 of tube 50. Potentiometer 65 of Fig. 5 is equivalent to the combination in Fig. 4 of resistor 56 and that section of potentiometer 57 included between the movable tap and cathode 55 of tube 50. Resistor 66 of Fig. 5 is the same as the section of potentiometer 57 in Fig. 4 included between the movable arm and the ungrounded D.C. input terminal.

Alto only one tetrode is here employed, two separate sources of contact potential are still employed to establish the equal potential points, as in all prior embodiments. The two contact potentials employed are those associated with the anode circuit and the screen grid circuit. The screen grid circuit is here used as though it were a second independent anode circuit, the screen grid being used here as a substitute for or equivalent to anode 58 of tube 51 (Fig. 4).

Points of equal potential are established in the potentiometers 12 and 65 by anode current and screen current flow respectively. The movable arms of the potentiometers are set at these points of equal potential and the potential at these points is set at ground by the ground connection on the movable arm of potentiometer 12.

In operation, during the conducting period the potential at the output point (at the movable contact of potentiometer 65) will be kept at zero by the current flow in the tube in a manner similar to that of the prior embodiments. In the non-conducting period, however, the output voltage will not rise to the full level of the input signal as was heretofore the case, for example in the embodiment shown in Fig. 4, where the output point is completely isolated from ground during the non-conducting period. In this fifth embodiment (Fig. 5), the input signal now has a path to ground even during the non-conducting period through resistor 66, the portion of potentiometer 65 between the movable tap and cathode 55, and the portion of potentiometer 12 between cathode 55 and ground. Consequently, during the period of non-conduction, the voltage appearing at the output point will be the input voltage multiplied by the ratio of the resistance between the output terminal and ground to the resistance between the input terminal and ground.

Since this ratio is necessarily less than one, there is a loss of sensitivity in this embodiment due to the incomplete isolation of the output terminal for ground. This loss is, as it were, the price one must pay for using one tube less.

In all of the foregoing, chopping and amplification of low-level substantially direct current input signals has been the main concern. However, the application of this invention is not limited to low-level input signals, as will now be explained.

High-level input signals may also be chopped and amplified. It will be noted that the substantially direct current input signal source, the impedance 13, part of the potentiometer 12, and the internal resistance of tube 11 (when tube 11 is conducting) form a series circuit. High-level input signals may be handled if care is taken to select a value of impedance 13 high enough so that the voltage impressed across the internal resistance of tube 11 by the input signal is too small to interfere with the operation of tubes 10 and 11.

Furthermore, the application of this invention is not limited to slowly varying alternating current signals in the absolute sense of this term, but is limited only to alternating signals which are slowly varying relative to the frequency of the cyclically varying voltage applied to the grids 17 and 20 of tubes 10 and 11. If, for example, a one megacycle per second square wave is applied to grids 17 and 20, input signals varying in frequency from zero to at least 100,000 cycles per second may be chopped and amplified. The invention thus becomes a flat-response, wide-band amplifier capable of handling frequencies from a lower limit of zero cycles per second to a high upper limit. The numbers used above are merely convenient illustrative figures and are not to be considered as limiting figures for the upper frequency.

Additional applications of this invention will surely suggest themselves to those versed in the art and, therefore, will not be mentioned here.

While the above is believed to be a correct explanation of the principles underlying the invention, further investigation may be lead to a modification of this theory. It is to be understood that the invention is independent of any theory which may be advanced to account for the results obtained.

What I claim is:

1. A device for converting substantially direct current input signals into alternating current signals comprising at least two unidirectional conducting devices of a type having inherent contact potential, each having an emitting element, a collecting element, and at least one control element, a potential-dividing impedance having an impedance element and a movable contact, said impedance element capable of passing direct current and having one terminal connected to the emitting element of said first of said unidirectional conducting devices whose collecting element is connected to a reference point and having its other terminal connected to the collecting element of said second of said unidirectional conducting devices whose emitting element is connected to a reference point, said unidirectional devices and potential-dividing impedance forming a potential-equalizing circuit in which the flow of current due to contact potential produces two points of equal potential, said reference point constituting one such point and the other lying on said potential-dividing impedance, a pair of connections to a source of substantially direct current input signals, one connection coupled to said reference point, an output impedance coupled between the other of said input signal connections and the movable contact of said potential-dividing impedance, a pair of connections for a cyclically varying voltage capable of intermittently interrupting conduction in said unidirectional conducting devices, one connection coupled to said reference point and the other coupled to said control element of each said unidirectional conducting device and a pair of output connections, one coupled to said movable arm of said potential-dividing impedance and the other coupled to said reference point.

2. A device for converting substantially direct current input signals into alternating current signals comprising at least two unidirectional conducting devices of a type having inherent contact potential, each having an emitting element, a collecting element, and at least one control element, a direct electrical coupling between the emitting element of a first of said unidirectional conducting devices whose collecting element is connected to a reference point and the collecting element of a second of said unidirectional conducting devices whose emitting element is connected to a reference point, a potential-dividing impedance having a first terminal, a second terminal, and a movable contact, said potential-dividing impedance being coupled between the control elements of said unidirectional conducting devices, a pair of connections for a source of periodic voltage, one connection coupled to the movable contact of said potential-dividing impedance and the other connection coupled to said reference point, said periodic voltage operable to intermittently cut off conduction in said unidirectional conducting devices, said unidirectional devices and their connections forming a switching and potential-equalizing circuit in which the flow of current due to contact potential produces two points of equal potential which can, by adjustment of the position of the movable contact of said potential-dividing impedance, be made to occur at said reference point and said direct coupling between said emitting and collecting elements, a pair of connections for a source of substantially direct current input signals, one connection coupled to said reference point, an output impedance coupled between the other connection to said source of substantially direct current waves and said direct coupling between the emitting and collecting elements of said unidirectional conducting devices, and a pair of output connections coupled across the series circuit comprising said connections to said source of substantially direct current input signals and said output impedance.

3. A device for converting substantially direct current input signals into alternating current signals comprising at least two unidirectional conducting devices, each having inherent contact potential and an emitting element, a collecting element, and at least one control element, a pair of connections for a source of voltage capable of intermittently interrupting conduction in said unidirectional conducting devices, one connection coupled to a reference point, a first potential-dividing impedance, the impedance element coupled between the control elements of said unidirectional conducting devices and the movable contact coupled to the other of said connections to said voltage source, a direct electrical coupling between the emitting element of a first of said unidirectional conducting devices and the collecting element of a second of said unidirectional conducting devices, a second potential-dividing impedance capable of passing direct current coupled between the collecting element of said first and the emitting element of said second of said unidirectional conducting devices, the movable contact being coupled to said reference point, said unidirectional devices and said second potential-dividing impedance forming a potential-equalizing circuit in which the flow of current due to contact potential produces two points of equal potential, one on said second potential-dividing impedance and the other at said direct coupling between said emitting and collecting elements, a pair of connections for a source of substantially direct current input signals, one coupled to said reference point, an output impedance coupled between the other connection for said source of substantially direct current input signals and said direct coupling between the emitting and collecting elements of said unidirectional conducting devices, and a pair of connections coupled across said input signal connections and said output impedance.

4. A device for converting substantially direct current signals into alternating current signals comprising, in combination, a switching and potential-equalizing circuit comprising at least two electronic sources of contact potential and first impedance means capable of passing direct current in circuit with said contact potentials, at least one closed loop being formed by said potential sources and said first impedance means, the flow of current producing at least two points of equal potential in said switching and potential-equalizing circuit, said equipotential points being separated by a value of impedance which is greater than zero; second impedance means connected at one end to one said equal potential point; a pair of connections for a source of substantially direct current input signals, one connection coupled to the other of said equal-potential points and the other connection coupled to the other end of said second impedance means; and means for intermittently open-circuiting said switching and potential-equalizing circuit.

5. A device for converting substantially direct current signals into alternating current signals comprising, in combination, a switching and potential-equalizing circuit comprising at least two electronic sources of contact potential and first impedance means capable of passing direct current in series circuit therewith, whereby at least one series loop is formed, the flow of current due to said contact potential sources producing at least two points of equal potential in said switching and potential-equalizing circuit, the value of impedance between said equipotential points being greater than zero; second impedance means connected at one end to one said equipotential point; a pair of connections for a source of substantially direct current input signals, one connection coupled to the other of said equi-potential points and the other connection coupled to the other end of said second impedance means; a pair of output connections coupled across said input signal connections and at least part of said second impedance means; and means for intermittently open-circuiting said switching circuit, said equal potential established at said one end of said second impedance means being removed and said one end of said second impedance means assuming a potential proportional to the potential at said other input signal connection when said switching circuit is open-circuited.

6. A device as set forth in claim 5, wherein said sources of contact potential are provided by a pair of unidirectional current conducting devices having at least three electrodes.

7. A device as set forth in claim 5, wherein said sources of contact potential are provided by a unidirectional current conducting device having four electrodes.

8. A device for converting substantially direct current input signals into alternating current signals comprising, in combination, at least two unidirectional current conducting devices of the type having inherent contact potential, each having an emitting element, a collecting element and at least two control elements, the emitting element of the first device being directly coupled electrically to the collecting element of the second device; a first potential-dividing impedance having an impedance element and a movable contact, said impedance element capable of passing direct current, the impedance element being coupled between said collecting element of said first device and said emitting element of said second device, said unidirectional devices and said first potential-dividing impedance forming a potential-equalizing circuit in the form of a loop in which the flow of current due to contact potential produces two points of equal potential, one at the junction of the emitting element of the first device and the collecting element of the second device, and the other upon the impedance element of said first potential-dividing impedance; a pair of connections for a source of substantially direct current input signals, one connection coupled to the movable contact of said first potential-dividing impedance and to a reference point; a second potential-dividing impedance having an impedance element and a movable contact, said impedance element capable of passing direct current, the impedance element coupled between the other input signal connection and said direct connection between said devices; a first impedance capable of passing direct current coupled between a second control element of said first device and the movable contact of said second potential-dividing impedance; a second impedance capable of passing direct current coupled between a second control element and said emitting element of said second device; a third potential-dividing impedance having an impedance element and a movable contact, the impedance element coupled between a first control element of each said device; a pair of connections for a source of periodic voltage capable of intermittently interrupting conduction in said devices, one connection coupled to the movable contact of said third potential-dividing impedance and the other connection coupled to said reference point; and a pair of output connections, one coupled to said reference point and the other coupled to said movable contact of said second potential-dividing impedance.

9. A device for converting substantially direct current signals into alternating current signals comprising, in combination, a unidirectional current conducting device of the type having inherent contact potential and having an emitting element, a collecting element and at least two control elements; a first potential-dividing impedance capable of passing direct current, said potential-dividing impedance having an impedance element and a movable contact, the impedance element being coupled between said collecting and said emitting elements of said device; a pair of connections for a source of substantially direct current input signals, one connection being coupled to the movable contact of said first potential-dividing impedance and to a reference point; a second potential-dividing impedance capable of passing direct current, said potential-dividing impedance having an impedance element and a movable contact, the impedance element coupled between a second control element and said emitting element of said device, said unidirectional device and said first and second potential-dividing impedances forming a potential-equalizing circuit in which the flow of current due to contact potential produces two points of equal potential, one on each of said potential-dividing impedances; a first impedance coupled between the movable contact of said second potential-dividing impedance and the other input signal connection; a variable impedance, connected at one end to a first control element of said device; a pair of connections for a source of periodic voltage capable of intermittently interrupting conduction thru said device, one connection coupled to said reference point and the other connection coupled to the other end of said variable impedance; and a pair of output connections coupled across said input signal connections and at least part of said first impedance.

10. A device for converting substantially direct current signals into alternating current signals comprising, in combination: a pair of connections for a source of substantially D.C. input signals; first impedance means connected at one end to one of said input signal connections to form a series combination with said input signal connections; and an electronic switching and potential-equalizing circuit including at least two sources of contact potential and impedance means, the latter being arranged circuitwise to form at least one series loop with the contact potentials, said switching circuit also including means for intermittently effectively disconnecting said potential sources from said switching circuit so that the latter is disabled, said contact potentials producing, when said switching circuit is enabled, at least two equi-potential points between which the impedance has a value greater than zero, the ends of said series combination being connected across said switching circuit at said equi-potential points, and the potential across said ends of said series combination depending, when said switching circuit is disabled, solely upon that of the substantially D.C. input signal since said two sources of contact potential are effectively disconnected.

11. A device as set forth in claim 10, including a pair of output connections connected across said input signal connections and at least a portion of said first impedance means.

12. A device as set forth in claim 10, including means for shifting, relative to one another, the position of occurrence of at least one said equi-potential point and the nearest point of connection between one end of said series combination and the switching circuit, so that coincidence between these points can be initially obtained and later re-obtained if circuit conditions vary.

13. A device as set forth in claim 10, wherein said sources of contact potential and said impedance means in said switching circuit are at least partially supplied by at least one unidirectional current conducting device.

14. A device as set forth in claim 10, wherein said impedance means in said switching circuit includes a potentiometer whose movable contact arm is connected to the other input signal connection of said series combination.

15. A device as set forth in claim 10, wherein said impedance means in said switching circuit includes a potentiometer whose movable contact arm is connected to the other end of said impedance means in said series combination.

16. A device as set forth in claim 10, wherein the value of impedance between said two equi-potential points in said switching and potential-equalizing circuit is large compared to the value of said first impedance means in said series combination.

17. A device for converting substantially direct current signals into alternating current signals comprising, in combinatiton: a first circuit element comprising a first source of contact potential and first impedance means in series with said contact potential; a second circuit element comprising a second source of contact potential and second impedance means in series with said second contact potential, one side of said first contact potential having a common connection with one side of said second contact potential, said first and second circuit elements being combined in at least one series loop forming a potential-equalizing circuit such that at least two points may be found therein that are at an equal potential when current flows and that are separated from each other by an impedance greater in value than zero, one of said equi-potential points to be known as the reference potential point; a third circuit element comprising connections for a source of substantially D.C. input signals and third impedance means in series therewith, the free end of said third impedance means and the unconnected input signal connection being connected to said loop at said equi-potential points, said input signal connection being connected to that equi-potential point known as the reference potential point; means connected to said first and second circuit elements for effectively open-circuiting said first and second circuit elements intermittently; and means for varying the potential at the point at which said other end of said third impedance means is connected by varying the relative effective values of the components of said first and second circuit elements with respect to each other so that said point may be set at exactly the reference potential, the device operating, after this setting has been accomplished, in such manner that, when said first and second circuit elements are in a current-conducting condition, the potentials existing at both ends of said third circuit element are identical with each other and, when said first and second circuit elements are in an open-circuited condition, the potential across said third circuit element depends solely upon that of the substantially D.C. input signal since said two sources of contact potential are effectively disconnected.

References Cited in the file of this patent

UNITED STATES PATENTS

| | | |
|---|---|---|
| 2,513,910 | Bliss | July 4, 1950 |
| 2,514,671 | Rack | July 11, 1950 |
| 2,583,832 | Goldberg | Jan. 29, 1952 |
| 2,599,675 | Volz | June 10, 1952 |
| 2,605,430 | Marcy | July 29, 1952 |
| 2,685,039 | Scarbrough et al. | July 27, 1954 |
| 2,688,695 | Odell | Sept. 7, 1954 |
| 2,695,956 | Mallinckrodt | Nov. 30, 1954 |
| 2,868,969 | Inniss | Jan. 13, 1959 |

OTHER REFERENCES

"Waveforms," Radiation Laboratory Series, vol. 19, by Chance et al., pages 376–377, Fig. 10.13, published by McGraw-Hill Book Co., Inc., New York, 1949.